Seliber

[15] 3,635,541
[45] Jan. 18, 1972

[54] PANEL-T INSTRUM...

[72] Inventor: Boris Abelevich Seliber, ulitsa Rentgena, 15/31, kv. 53, Leningrad, U.S.S.R.

[22] Filed: May 1, 1969

[21] Appl. No.: 820,768

[52] U.S. Cl. .................................350/6, 324/97, 350/285
[51] Int. Cl. ..................................G01r 13/38, G02b 17/00
[58] Field of Search ...........................350/6–7, 285; 324/97

[56] References Cited

UNITED STATES PATENTS 2,258,952   10/1941   Hicks et al. .........................324/97 X

FOREIGN PATENTS OR APPLICATIONS 120,286   5/1927   Switzerland ...............................350/6

U.S.S.R. ..................................324/97

Primary Examiner—David Schonberg
Assistant Examiner—John W. Leonard
Attorney—Waters, Roditi, Schwartz & Nissen

[57] ABSTRACT

A panel-type multichannel instrument comprises in each measuring channel identical measuring assemblies. These measuring assemblies comprise rotating mirrors capable of being rotated under the effect of measured variables. A device for producing on a common scale an optical indicator is provided such that the indicator is formed by light beams reflected by the rotating mirrors. Auxiliary mirrors are interposed in the path of the light beams reflected by the rotating mirrors between the common scale and the rotating mirrors such that the images produced by the auxiliary mirrors lie on a common straight line in the scale while the path lengths of the light beams from the rotating mirrors to any selected horizontal location on the scale are equalized.

6 Claims, 4 Drawing Figures

PANEL-TYPE MULTICHANNEL INSTRUMENT

This invention relates to a panel-type multichannel light spot measuring instrument having a plurality of measuring assemblies and a common scale. The instruments of this type are primarily intended for monitoring the performance of power plants, elaborate manufacturing equipment, etc., whose operation involves the necessity of measuring simultaneously a plurality of parameters. The instruments may likewise find application for monitoring the parameters of a plurality of identical objects, e.g., for measuring the temperature and steam flow rate at the exit side of several steam boilers.

At present, control and operating panels and boards to be used in conjunction with elaborate equipment systems incorporate panel-type instrumentation, viz, pointer-type and automatic indicating instruments, and recording control potentiometers and bridges. The employment of the aforesaid instruments renders control panels and boards excessively cumbersome and complicates the process of operation control. Moreover, the fact that the indices of diverse instruments are located at a considerable distance from one another does not make it possible to readily correlate the readings of different instruments and to obtain the overall pattern of the variables being measured.

There are known panel-type electrical measuring instruments incorporating a plurality of measuring assemblies with light pointers and an optical system which projects light spots onto a common scale (cf. Swiss Pat. No. 120,286, cl. 66 a). In the aforesaid instruments, the scale is essentially a semitransparent rectangular plate with a grid applied thereonto, or use is made of a modified scale comprising a semitransparent plate and an auxiliary transparent element furnished with an appropriate grid. Plotted on the abscissa is the measured variable, whereas on the ordinate are plotted the serial numbers of the measuring assemblies (channels), or vice versa. For the sake of simplicity, the description of the known instrument is made with reference to the first modification thereof, wherein the measured variable is plotted on the abscissa and the channel numbers, on the ordinate.

As the measured variables change, the mirrors of the measuring assemblies will rotate, thereby causing light spots (optical indicators) to be displaced along horizontal lines which are parallel to one another. In these known instruments, measuring assemblies are disposed one above another in a vertical block, so that the axes of mirror rotation are coincident. The measuring assembly block may in principle be disposed in the instrument casing at any point relative to the instrument scale, insofar as the tangential error due to the dissimilarity of the light beam paths from the rotating mirrors of measuring assemblies to the scale at different angles of mirror rotation will be equal at any common position along the scale for all the measuring channels, since the axes of rotation of the mirrors in the measuring assemblies coincide. This arrangement is useful inasmuch as it makes it possible to have one common scale of graduation for all the measuring channels used.

The height of the multichannel instrument disclosed in Swiss Pat. No. 120,286 depends upon the sum of heights of all the measuring assemblies disposed above one another, so that in this known instrument the number of measuring channels cannot be large. On the other hand, the height of the scale, which coincides with the ordinate, is practically equal to the height of a light spot multiplied by the number of measuring channels. Thus, the scale of a 20-channel instrument, in which the optical pointer has a height of 5–6 mm., would be at most 100–150 mm. high, whereas the dimensions of the measuring assemblies make it mandatory for an accurate 20-channel instrument to be at least 300–400 mm. in height. It is, therefore, a disadvantage of the known instruments that their height should be significant as compared to the requisite height of the scale, whereas the dimensions of the measuring assemblies used preclude the possibility of disposing a large number of measuring channels in the instrument casing. The aforesaid disadvantages are, presumably, responsible for the fact that the known instruments have found but a limited application.

Accordingly, it is an object of the present invention to provide a panel-type multichannel light spot instrument having a plurality of measuring assemblies and a common scale, in which the overall dimensions will be smaller as compared to those of the known instruments having the same number of measuring channels, or which will have a greater number of measuring channels than the known instruments of identical overall dimensions.

It is a further and more specific object of the present invention to provide a panel-type multichannel instrument, in which the optical system will be constructed so as to obtain an equal path length for all the light beams from the rotating mirrors to the scale in all the measuring channels.

This object is accomplished by the provision of an optical system wherein, according to the invention, auxiliary mirrors are interposed in the path of light beams reflected by rotating mirrors, between the measuring assemblies, at least two of which assemblies incorporate rotating mirrors having parallel but not coincident axes of rotation. The auxiliary mirrors are arranged so that light beams reflected by said auxiliary mirrors from the rotating mirrors will lie in a common vertical plane which intersects the scale on a common straight line, while also the path lengths of light beams from the rotating mirrors to any selecting vertical line of the scale will be equal for all measuring channels.

In one form of the present invention, the measuring assemblies are united in blocks so that in each block the axes of rotation of the rotating mirrors are coincident, wherein as the axes of rotation of the rotating mirrors disposed in different blocks are parallel but not coincident, the overall dimension of a block in the direction of rotating mirror axes being approximately equal to the height of all optical pointers on the instrument scale.

In another form of the present invention, use is made of an odd number of blocks, of which some are disposed in pairs in a symmetric manner, whereas the others are arranged so that the axes of rotation of the rotating mirrors therein are coincident with the aforesaid straight line of virtual images.

Where the measuring assemblies are arranged in a plurality of blocks in an orthodox manner, the object of the present invention cannot be accomplished, insofar as, with one common scale, the tangential errors of the channels, whose measuring assemblies are disposed in different blocks, would be essentially dissimilar for one and the same point on the scale. This situation would result in an increased tangential error of the instrument in toto and would make instrument adjustment excessively elaborate, whereas the employment of auxiliary mirrors mounted as indicated herein above makes it possible to obtain identical values of the tangential error at any point of the scale and for all the measuring channels used.

The present invention is illustrated hereinbelow by the description of an exemplary embodiment thereof with reference to the accompanying drawings, wherein.

Figure 1:
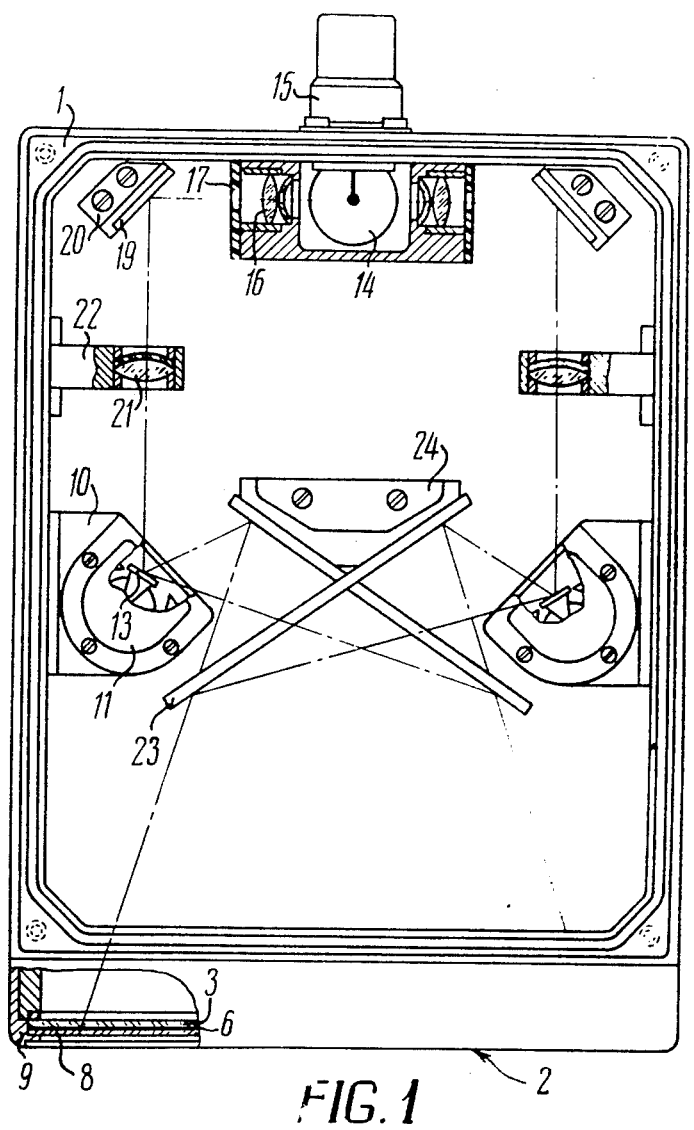
FIG. 1 is a plan view of the multichannel light spot instrument with the instrument cover removed.
Figure 2:
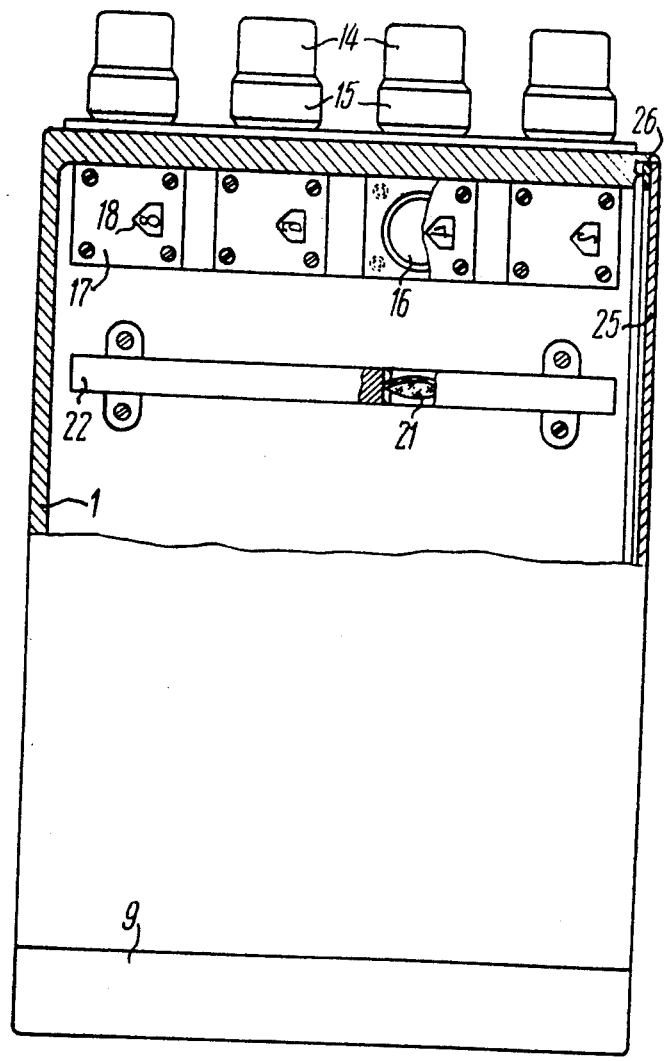
FIG. 2 is a left-hand side view of the instrument of FIG. 1.
Figure 3:
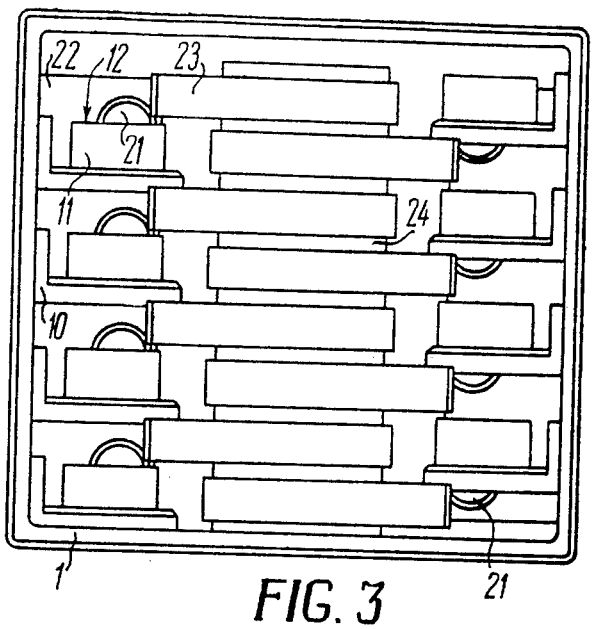
FIG. 3 is a front view of the instrument of FIG. 1, with the instrument scale removed.
Figure 4:
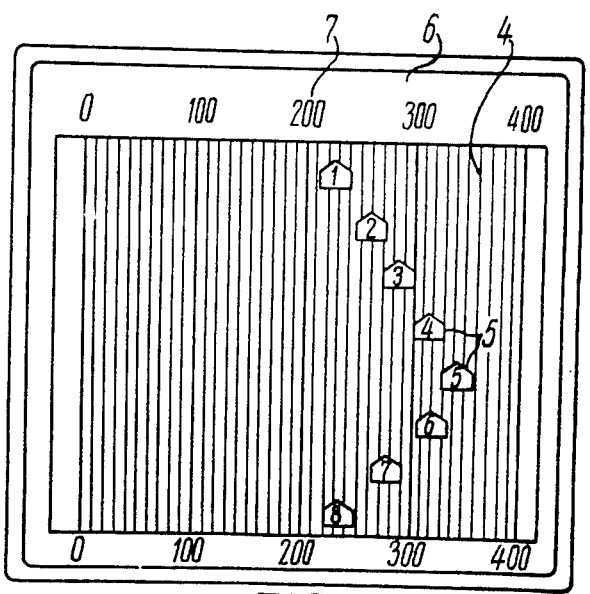
FIG. 4 shows a front view of the instrument of FIG. 1.

The multichannel instrument (FIGS. 1, 2 and 3) comprises casing 1 whose front wall 2 carries scale 3 made in the form of graduated translucent ground screen 4 (FIG. 4) onto which are projected light spots 5. In scale 3 provision is made for plate 6 which carries scale mark numbers 7, and protective glass 8 (FIGS. 1, 2 and 3). To fasten scale 3 and protective glass 8 to casing 1, use is made of frame 9.

Mounted on brackets 10 inside instrument casing 1 are measuring assemblies 11 disposed in two parallel blocks 12, the movable parts of the measuring assemblies in a given block being arranged coaxially in relation to one another. In each measuring assembly provision is made for a rotating mirror 13, the axes of rotation of all mirrors 13 in a given block being coaxial. The optical system of the instrument that shapes light spots 5 incorporates illuminators (incandescent lamps) 14 with sockets 15 (use is made of one illuminator per a pair of channels), condensers 16, diaphragms 17 accommodating transparent plates 18 in the diaphragm apertures, short mirrors 19 mounted on brackets 20, object lenses 21 mounted on brackets 22, and auxiliary mirrors 23 mounted on bracket 24. In this form embodying the invention, one mirror 19 is used in conjunction with each group of measuring assemblies, whereas condensers 16, diaphragms 17, object lenses 21 and mirrors 23 are each used in an amount equal to the number of measuring assemblies. The arrangement of mirrors 23 in relation to measuring assemblies 11 makes for superimposing on a straight line, which coincides with the axis of symmetry of the instrument, the virtual images of the filaments, said images being coincident with the axes of rotation of rotating mirrors 13 in all the measuring assemblies.

The superposition of the aforesaid virtual images on a single straight line results in all the measuring assemblies having one and the same tangential error at any point of the scale.

In order to properly arrange light spots 5 vertically on scale 3, the apertures in diaphragms 17 and measuring assemblies 11 with mirrors 23 disposed on either side of the instrument axis of symmetry are displaced vertically in opposite directions in relation to the optical axes of each measuring channel.

It is advantageous to place on scale 3 a transparent stencil (not shown in the figures) having diverse auxiliary indices or marks, e.g., a mark denoting the rated value of a measured variable. It is further expedient to dispose behind scale 3 color filters (not shown in the figures,) which are intended for changing the color of the light spot once it reaches a preset scale mark.

To close the instrument from the top, use is made of cover 25 furnished with sealing gasket 26.

The light flux emitted by lamps 14 is collected by condensers 16, whereupon it passes through the apertures of diaphragms 17 and is focused on rotating mirrors 13 of measuring assemblies 11 by means of mirrors 19 and object lenses 21. The images of the apertures of diaphragms 17 are projected by means of mirrors 23 onto scale 3 in the form of optical indicators (light spots) 5. Plates 18 bearing figures to denote channel serial numbers and disposed in diaphragms 17 serve to indicate the measuring channel to which a given light spot belongs. When the measured variable sets in rotation the movable part of the measuring assembly with mirror 13, light spot 5 will be caused to travel along scale 3. The set of light spots 5 (FIG. 4) yields on scale 3 a curve, which is useful for evaluating the mode of distribution of the variables being measured.

In the instrument described herein before, use is made of eight measuring assemblies arranged in two blocks so that each block contains 4 measuring assemblies, but those skilled in the art will readily appreciate that the present instrument may incorporate either a greater or a smaller number of measuring assemblies. For example, it is practicable to dispose on the instrument axis of symmetry the third measuring assembly block in such a manner that the axes of rotation of the rotating mirrors in said block would coincide with a straight line on which there lie the virtual images of the filaments, said images being coincident with the axes of rotation of the rotating mirrors in the other two blocks. The overall size of each block along the axis of mirror rotation should be approximately equal to the height of all the light spots projected onto the scale.

The optical system of the instrument may incorporate illuminators and other elements whose number differs from that in the form of the instrument described hereinbefore. Thus, instead of using one common lamp for a pair of measuring assemblies, the optical system may contain a separate lamp for each measuring assembly.

It should be borne in mind that the form of realizing the invention described hereinbefore with reference to the accompanying drawings relates to a preferred embodiment of the present invention, but recourse may be had to other forms of the instrument, according to the invention, involving different amounts, shapes, dimensions and dispositions of elements. For example, the elements described hereinbefore and shown in drawings may be replaced by equivalent elements, the manner in which selected elements are disposed in the instrument lends itself to variations, selected elements may be used independently of other elements, provided all changes and modifications fall within the scope and spirit of the invention as disclosed in the appended claims.

What is claimed is:

1. A panel-type multichannel instrument having a plurality of measuring channels comprising in each measuring channel identical measuring assemblies, said measuring assemblies comprising rotating mirrors capable of being rotated about preset axes under the effect of measured variables; a common scale; means for producing on said common scale an optical indicator, said indicator being formed by light beams reflected by said rotating mirrors, at least two of said measuring assemblies including spaced and parallel rotation axes of the rotating mirrors disposed in the different assemblies; auxiliary mirrors interposed in the path of light beams reflected from said rotating mirrors between said scale and said measuring assemblies, said auxiliary mirrors being disposed to reflect in turn light beams reflected from the rotating mirrors so that virtual images produced by said auxiliary mirrors and coincident with the rotation axes of said rotating mirrors lie on a common straight line while the path lengths of light beams from the rotating mirrors to any selected line on said scale parallel to the axes of rotation of the rotating mirrors will be equal for all the measuring channels used.

2. An instrument according to claim 1, wherein the measuring assemblies are united in at least two spaced blocks, the rotation axes of rotating mirrors being coincident within each block and not coincident but parallel in different blocks, the overall size of a block in the direction of rotation axes of the rotating mirrors equaling approximately the height of all optical pointers on the instrument scale.

3. An instrument according to claim 2, wherein said blocks are of an odd number and of which some blocks are disposed in pairs in a symmetric manner, whereas the remaining blocks are arranged so that the rotation axes of rotating mirrors therein are coincident with said straight line on which there lie virtual images.

4. An instrument according to claim 1 wherein said auxiliary mirrors are supported in mutual intersecting relation between the spaced rotating mirrors of the measuring assemblies respectively.

5. An instrument according to claim 4 wherein said auxiliary mirrors are fixedly supported relative to said rotating mirrors.

6. An instrument according to claim 5 wherein said means for producing the optical indicator comprises a light source, and means for directing light beams from said sources to said rotating mirrors to intersect the axes of rotation thereof.

* * * * *